Figure 1:
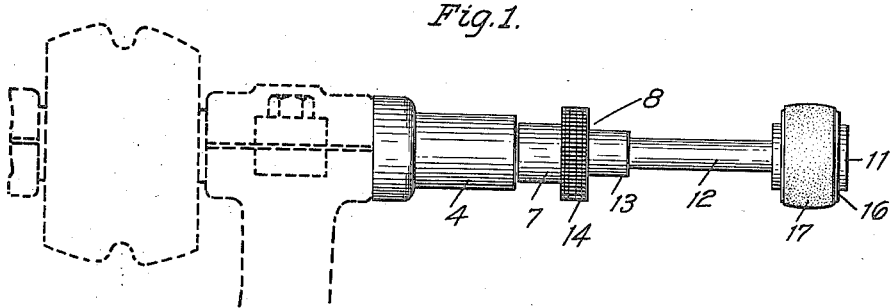

S. A. CROCKER, Jr.
DENTAL TOOL.
APPLICATION FILED APR. 25, 1916.

1,208,501.

Patented Dec. 12, 1916.

UNITED STATES PATENT OFFICE.

SAMUEL A. CROCKER, JR., OF CINCINNATI, OHIO, ASSIGNOR TO THE SAMUEL A. CROCKER COMPANY, OF CINCINNATI, OHIO, A CORPORATION OF OHIO.

DENTAL TOOL.

1,208,501.     Specification of Letters Patent.     Patented Dec. 12, 1916.

Application filed April 25, 1916. Serial No. 93,541.

*To all whom it may concern:*

Be it known that I, SAMUEL A. CROCKER, Jr., a citizen of the United States of America, and resident of Cincinnati, in the county of Hamilton and State of Ohio, have invented a new and useful Improvement in Dental Tools, of which the following is a specification.

This invention relates to a means for mounting upon an arbor of a lathe, an abrading band for dressing rubber or metal plates.

In dental tools of the type disclosed in the United States Letters Patent #574,763 issued to Flavel A. Rudolph upon January 5, 1897, the objection has been that their use has been confined to lathes having their heads located on but one side of the operator and running in but one direction, the abrading element carried thereby having a tendency to loosen upon the arbor of the tool and to therefore fail to be revolved against the work held in engagement therewith. This objection has been overcome in the tool illustrated in the drawings and described in the following specification.

Figure 2:
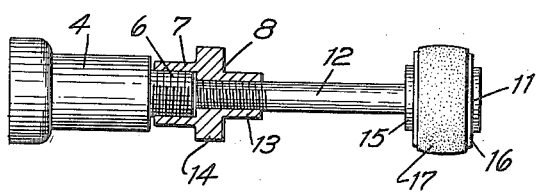
Figure 3:
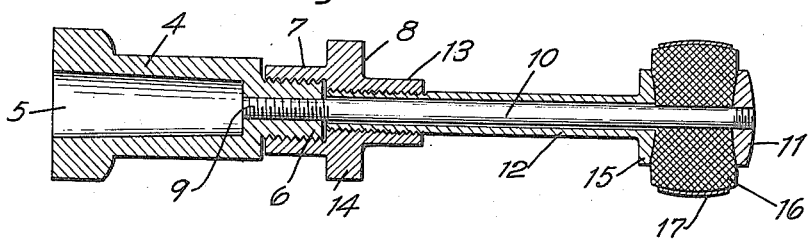

An object of my invention is to produce a dental tool in which means are employed for tightening and for maintaining the abrading band in position on the expansible member of the tool and which may be used upon either side of the lathe head. This and other objects are attained in the dental tool described in the following specification and illustrated in the accompanying drawings, in which:

Figure 1 is a side elevation of a tool embodying my invention, mounted upon the spindle of a dental lathe head. Fig. 2 is a side elevation of the tool shown in Fig. 1, but showing a portion thereof in section to more fully disclose its construction. Fig. 3 is a longitudinal sectional view of my improved tool upon an enlarged scale.

My improved construction consists of a socket 4 having a suitable opening 5, for the reception of the lathe head spindle, and an extension 6 provided exteriorly with screw threads as shown in Figs. 2 and 3, adapted to coöperate with screw threads formed in the collar-like extension 7 of a nut 8. Located in the extension 6 of the socket 4 and secured therein by means of screw threads 9, is a spindle 10 which at its outer or forward end is provided with a head 11 preferably screwed onto the end of the spindle or arbor as shown in Fig. 3. Mounted on the spindle 10 and adapted to reciprocate thereon is a sleeve 12, the end adjacent to the screw threaded extension 6 of the socket 4, being provided with screw threads adapted to coöperate with screw threads formed within an extension 13 of the nut 8. Between the extensions 7 and 13 of the nut 8 is formed a knurled portion 14, see Fig. 1, which is provided for the purpose of rotating nut 8. As shown in Fig. 2 the screw threads of the sleeve 12 and extension 6 are so formed that one is right handed and the other is left handed, or vice versa, as are also the screw threads formed in the extensions 7 and 13 of the nut 8, and which coöperate with the screw threads of the socket and sleeve. By means of this construction the nut 8 may be rotated in one direction and affords rapid movement of the sleeve 12 toward the head 11 because of the double motion produced thereby, the nut 8 moving away from the socket 4 simultaneously with the movement of the sleeve 12 away from the nut 8. On the opposite end of the sleeve 12 a flange 15 is formed, the flange being of substantially the same size as the head 11 and coöperating therewith to retain the member 16 in position on the spindle. The member 16 is preferably made of some suitable yielding material such as rubber so as to permit of its being compressed axially when the sleeve 12 is moved toward the head 11. The purpose of this expansible member is to receive a band 17 of abrading material such as emery cloth, upon its periphery so that when the flange 15 is moved by the sleeve 12 toward the head 11 the cylindrical yielding member 16 will be expanded within the band 17 and thus hold the band 17 securely in position on the expansible member. In order to facilitate the expansible action of the flange 15 and head 11 I have preferably formed their compressing surfaces in a cone-like formation, the object being to increase the tendency for the yielding material of the member 16 to be forced outwardly and to consequently expand within the band 17.

As previously set forth the constructions of dental tools of the type herein disclosed, have been such that they could be used upon only one end of the spindle of a lathe head and could be used only when the spindle was rotated in one direction. Upon reversing the rotation of the spindle it has been found that the sleeve would be moved away from the yielding member 16 and thus permit the member to contract with the result that the abrading band upon its periphery would become loosened. This is because of the tendency during rotation for the pull upon the abrading band through the yielding member and its friction against the flange of the sleeve, to cause the screw threads of the sleeve to rotate within the screw threads of the nut in a direction such that the sleeve would be moved away from the yielding member and consequently permit it to become loosened. This prevented the use of a tool of this description upon either end of the lathe head spindle or upon the same end of the spindle when the spindle was subjected to occasional reverse rotation. This objection has been overcome in my improved construction for the reason that the right and left hand screw threads operate in such a manner that when the tendency is for one screw thread to move in a direction to loosen the yielding member, the other screw thread will move in the opposite direction to tighten the yielding member. Thus the tendency of one is counterbalanced by the operation of the other so that the compression of the yielding member is not reduced. This operation of the screw threads occurs upon rotation of the tool in either direction, each screw thread opposing the action of the other screw thread whenever the direction of rotation is reversed. It will thus be seen that I have provided a construction in which the tool may be used upon either end of a lathe head spindle and in which rotation of the tool may be reversed at any time without danger of the abrading band mounted on the yielding member, becoming loosened thereby.

Having thus described my invention, what I claim is:

In combination in a dental tool a socket having screw threads formed at its end, a spindle extending therefrom and having a headed end, a sleeve reciprocally mounted on the spindle and having one end screw threaded and the opposite end flanged, a yielding member located between the head and the flange, and a screw threaded member coöperating with the screw threads of the sleeve and socket and adapted to force the flange toward the head to expand the yielding member, said screw threads being so formed that use of the tool during rotation in either direction will maintain uniform expansion thereof.

In testimony whereof, I have hereunto subscribed my name this 24th day of April, 1916.

SAMUEL A. CROCKER, Jr.

Witnesses:
 WALTER F. MURRAY,
 W. THORNTON BOGERT.